United States Patent [19]

Larson et al.

[11] Patent Number: 4,572,228

[45] Date of Patent: Feb. 25, 1986

[54] CONNECTOR VALVE ASSEMBLY FOR INFLATABLE PACKER DEVICE

[75] Inventors: Richard E. Larson, Minnetonka; Dale K. Nelson, Minneapolis; Allen D. Mathison, Richfield, all of Minn.

[73] Assignee: Cherne Industries, Inc., Minneapolis, Minn.

[21] Appl. No.: 685,540

[22] Filed: Dec. 24, 1984

[51] Int. Cl.$^4$ .................... G01M 3/08; F16K 43/00; F16L 55/16; F16L 55/18

[52] U.S. Cl. ........................................ 137/15; 71/65; 73/40.5 R; 137/315; 137/355.12; 137/355.17; 137/355.27; 137/636; 138/90; 138/93; 138/97; 239/189; 239/197; 239/199

[58] Field of Search ............... 73/40.5; 71/65; 134/24; 137/15, 315, 355.12, 355.16, 355.17, 355.2, 355.26, 355.27, 636; 138/90, 93, 97; 239/188, 189, 195, 197, 198, 199

[56] References Cited

U.S. PATENT DOCUMENTS

| | | | |
|---|---|---|---|
| 2,976,191 | 3/1961 | Weston | 138/93 |
| 3,103,235 | 9/1963 | Stringham, III | 138/97 |
| 3,168,909 | 2/1965 | Zurbrigen et al. | 138/97 |
| 3,269,421 | 8/1966 | Teleford et al. | 138/97 |
| 3,400,574 | 9/1968 | Cramer | 73/40.5 R |
| 3,453,869 | 7/1969 | Cherne | 73/40.5 R |
| 3,750,711 | 8/1973 | Conklin et al. | 73/40.5 R |
| 3,762,446 | 10/1973 | Tungseth et al. | 73/40.5 R |
| 3,834,422 | 9/1974 | Larson | 138/97 |
| 4,067,349 | 1/1978 | Austin et al. | 73/40.5 R |

FOREIGN PATENT DOCUMENTS

2908351 9/1980 Fed. Rep. of Germany .... 73/432 R

Primary Examiner—G. L. Walton
Attorney, Agent, or Firm—Anthony G. Eggink

[57] ABSTRACT

The connector valve assembly is for insertion between a fluid inlet line assembly and an inflatable packer device having an externally disposed chemical dispensing assembly to pressure test and repair pipelines. The connector valve assembly is connectable to the fluid inlet line assembly which is comprised of a first chemical line, a second chemical line and a test media line and to the inflatable packer which has input connectors to receive the first and second chemical lines. The connector valve assembly has a first chemical conduit with an actuatable valve and connectors at opposite ends to transfer a first chemical component. A second chemical conduit with an actuatable valve and having connector means at opposite ends transfers a second chemical component. A valve actuating means is in communication with the second conduit at a location before its valve to simultaneously activate the valves of the first and second conduits. And, a test media conduit with a check valve to transfer a testing fluid is in communication with the second chemical conduit at a position beyond its actuatable valve. The connector assembly when inserted between the fluid inlet lines and the packer device, permits the chemical dispensing assembly of the packer device to test for pipeline leaks by dispensing a test media fluid and to seal pipeline breaks by simultaneously dispensing predetermined rates of two chemical components.

20 Claims, 7 Drawing Figures

CONNECTOR VALVE ASSEMBLY FOR INFLATABLE PACKER DEVICE

BACKGROUND OF THE INVENTION

This invention relates to a connector valve assembly for an inflatable packer device. Particularly, this invention relates to a connector valve assembly for insertion between a five line fluid input assembly and an inflatable packer device having connecting means for four input lines.

Sealant systems, such as the acrylamide type, have been utilized in the past with packer devices to repair sewer line leaks. And these, as well as other sealant systems, have generally been utilized with four fluid inlet line systems. Because the acrylamide sealant systems have come under environmental scrutiny and because the packer devices which utilize the four inlet line systems have been found functionally limited in properly testing and subsequently sealing the interior wall surfaces of sewer lines, the connector assembly of this invention was developed to overcome these difficulties and inadequacies.

Other sealant systems have been and are also being developed for use with inflatable packer devices to test and repair sewer pipes. These systems generally use a two component chemical sealant system, i.e., a two component urethane sealant system, which uses a viscous sealing gel and an activator fluid. And, thus, along with the two compressed air supply generally required for an inflatable packer device, if an appropriate testing media is desired for use, it is necessary to have a five inlet line suspply system.

To overcome the need for a five inlet line system and a four inlet pipe inflatable packer device, it has been proposed to utilize one of the chemical components of a two part sealant system, i.e., the activator component, for the test mode operation of the packer to test for leaks in a pipe or sewer line. This practice has monetary as well as other disadvantages. Another alternative, is the restructure of the interior plumbing of the inflatable packer device itself. This solution has similar disadvantages and would also yield smaller through-flow areas of for sewage materials through the device.

The connector valve assembly of this invention provides an inflatable packer device with the functional use of a separate test media line without the added expense of retooling the packer device itself. And, despite the longstanding need of such a connector valve assembly for use with inflatable packer devices, none in so far as is known, has been developed.

The connector valve assembly of this invention is useful for providing the chemical sealant components, a test media fluid and compressed air to the external couplings of an inflatable packer device. The connector assembly permits the transfer of these fluids from their respective fluid sources to the couplings of a packer device. And, importantly, the connector assembly provides the effective use of an additional test media line to the packer without requiring an additional internal line in the packer design, and without effecting its normal operation. The connector assembly also is useful in providing an operator with means to test a pipeline for leaks and to repair any leaks found, from a remote location.

The connector valve assembly of this invention provides a means external the inflatable packer of yielding an additional useful line source to the interial lines of the device itself. This connector valve assembly does so in a functional and inexpensive manner, and one which does not interfere with the repair function of the packer device.

SUMMARY OF THE INVENTION

The connector valve assembly is for use with the fluid inlet lines of an inflatable packer device having an externally disposed chemical dispensing assembly to test and repair pipeline leaks.

The connector valve assembly is insertable between these fluid inlet lines which consist of a first chemical line, a second chemical line and a test media line, and the inflatable packer, which additionally has input connectors for the first and second chemical lines.

The connector valve assembly has a first chemical conduit with an actuatable valve and connectors at opposite ends for transferring a first chemical component. A second chemical conduit with an actuatable valve and having connector means at opposite ends is provided to transfer a second chemical component. And, a valve actuating means is provided to simultaneously activate the valves in the first and second conduits. The valve actuating means is in communication with the second chemical conduit at a location before its actuatable valve.

Further, a test media conduit having a connector at one end is provided to transfer a testing fluid. The test media conduit has a check valve in communication therewith and is in communication with the second chemical conduit at a position beyond its actuatable valve.

With the connector valve assembly inserted between the fluid inlet lines and the packer device, the packer device is able to test a pipeline for leaks through its chemical dispensing assembly by the activation of the test media fluid which opens the check valve and permits its flow through the second chemical conduit. And, the packer device is able to seal a leak in the pipeline by simultaneously dispensing predetermined rates of two chemical components by introducing fluid pressure from the second chemical conduit to the valve actuating means which is operable on the valves in the first and second conduits.

Additionally provided by the invention are means to inject other chemical agents, such as root inhibitors, through the test media line so that the introduction of these agents can be effectuated at the site of pipeline leakage during the test mode operation.

And, provided by the invention, are methods of testing a sewer line for leaks from a remote position utilizing the connector valve assembly.

These and other benefits of this invention will become clear from the following description, by reference to the drawings.

DESCRIPTION OF THE PREFERRED EMBODIMENTS

In order to more clearly explain the nature and purpose of this invention, the description will first focus on the elements with which the connector valve assembly of this invention cooperates.

Figure 1:
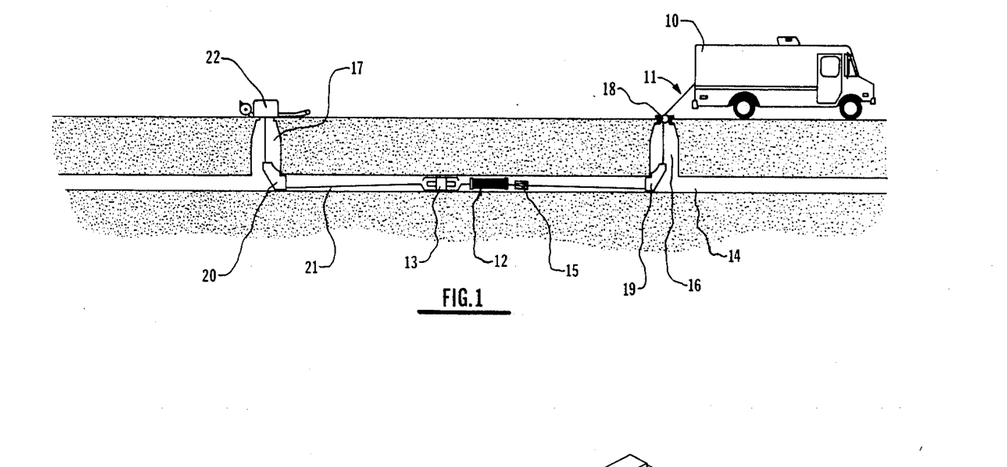
FIG. 1 is a schematic plan view which shows the connector valve assembly of this invention in use with an inflatable packer device positioned in a sewer line for testing and repair purposes.

Referring to FIGS. 1, a motorized vehicle 10 is shown at a site for testing and/or repairing a sewer line 14. The vehicle 10, such as a van, as will be further explained, carries the required testing apparatus, fluid input lines and chemical components to the site, and it houses a remote operating test seal panel for activating and controlling the various testing and sealing operations.

Figure 2:
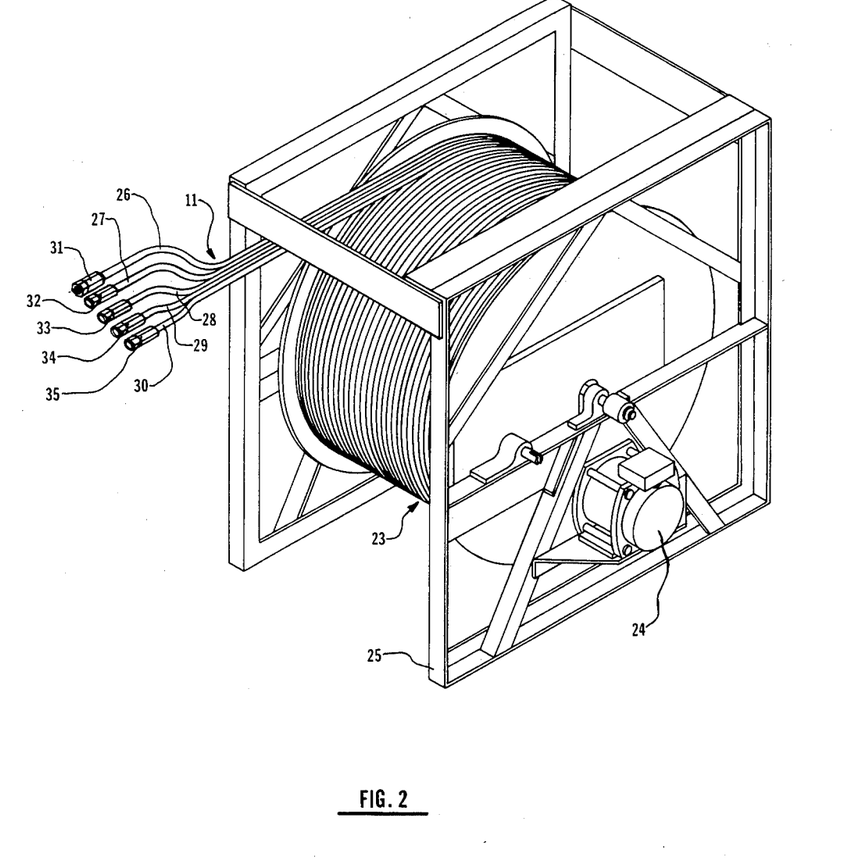
FIG. 2 is a schematic perspective view of a five line hose reel assembly with which the connector valve assembly of this invention is used.

FIG. 2 illustrates a five line hose/reel assembly 23 mounted for rotation on frame 25. This assembly is stationed in van 10 and is operated and controlled by the control panel 61 located in the van 10. The control panel 61 (FIG. 5) is able to activate motor 24 to wind or unwind the five line or hose assembly 11 from or onto the hose/reel assembly 23. The five line or Penta hose assembly 11 is comprised of individual input lines or hoses 26, 27, 28, 29 and 30 having connecting means, such as threaded connectors, 31, 32, 33, 34 and 35 attached at their respective ends. The input lines 26, 27, 28, 29 and 30, respectively supply compresed air, a test media fluid and chemical components to the packer device 12.

The five line assembly 11 is shown in FIG. 1 to extend from van 10 into a manhole 16 to the connector assembly 15, which is attached to the inflatable packer device 12. The winding and unwinding of the line assembly 11 is facilitated by a surface roller assembly 18 and a manhole jack roller assembly 19.

At an adjacent manhole 17, a windup winch assembly 22 is located to wind a tow cable 21 which is connected to a sled assembly 13 on which a television camera is located. The winding of the tow cable 21 is facilitated by a manhole jack roller assembly 20 which is located at the intersection of manhole 17 and the sewer line 14.

Thus, as the windup winch assembly 22 winds the tow cable 21 thereon, the sled assembly 13 with the video camera mounted thereon is moved through the sewer line 14. The packer device 12 is connected to the sled assembly 13 for towing therewith. And, the operator located in van 10 is able to visually moniter the interior condition of the sewer line 14 as the sled 13 is moved. Because of the known and constant distance between the sled 13 and packer device 12, the operator is able to locate the packer device 12 at predetermined location in the sewer line 14 to inspect its walls and joints for leakage and to seal a leak area if required.

Figure 3:
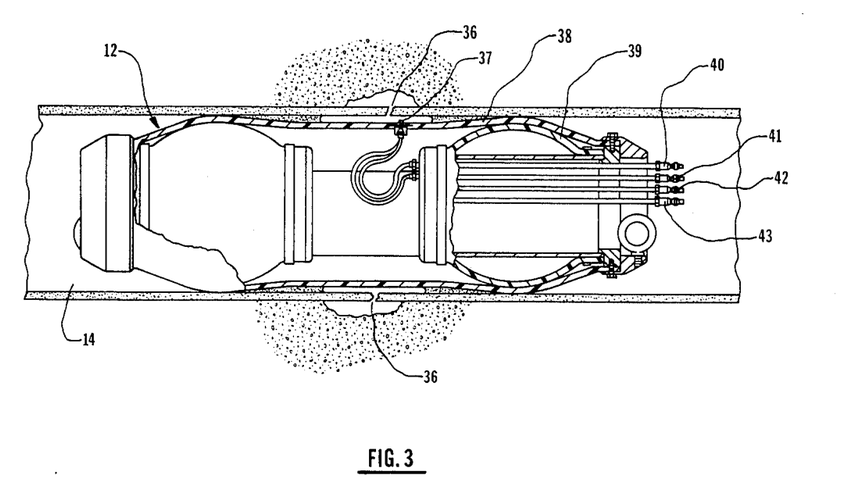
FIG. 3 is a schematic plan view with cut-away portions which shows an inflatable packer device positioned over a sewer line joint.

FIG. 3 shows the inflatable packer device 12 positioned in sewer line 14 in proximity to a leak area 36 of its wall structure. The inflatable packer device 12 is for testing the a sewer line 14 to locate and repair any leaks through its walls. The inflatable packer device shown has input line connectors 40, 41, 42 and 43 to receive compressed air for operating the packer and two chemical components to repair any leaks in the sewer pipe. The packer device 12, as further described in U.S. Pat. No. 3,834,422 (Larson), has a flexible outer sleeve 38, a pair of inflatable end elements 39 (one is shown in the cut away view of FIG. 3), and an externally disposed chemical dispensing assembly 37.

For purposes of describing the connector valve assembly of this invention, the input line connectors to the inflatable packer device 12 have the connector 40 to activate the inflatable outer sleeve 38 for testing and sealing purposes, the connector 41 to activate the inflatable end elements 39 for positioning the packer device in the sewer line 14, and connectors 42 and 43 to receive the two chemical components for sealing purposes. The latter connectors, 42 and 43 being in communication with the externally disposed chemical dispensing assembly 37, having two dispensing valves, of the packer.

Figure 4:
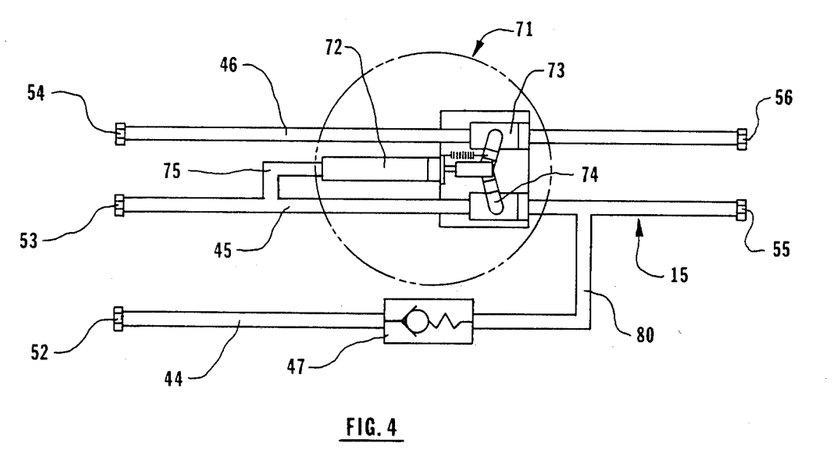
FIG. 4 is a schematic diagram which illustrates the connector valve assembly of this invention.
Figure 5:
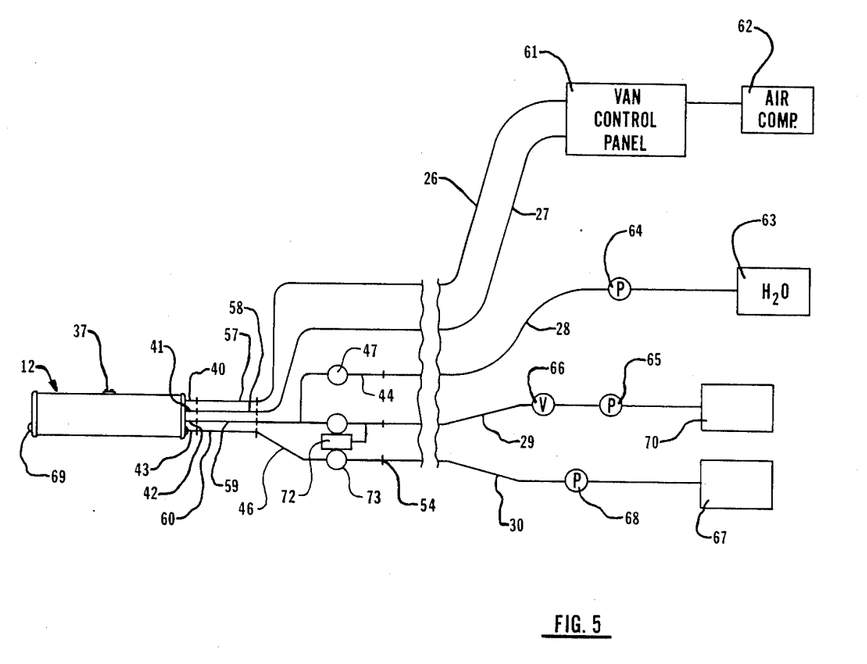
FIG. 5 is a schematic diagram which illustrates the connector valve assembly of this invention and which shows the functional cooperation of the connector assembly with a five line assembly and an inflatable packer device.

FIG. 4 illustrates the connector valve assembly 15 of this invention. The connector assembly 15 consists of a test media conduit 44, a second chemical conduit 45 and a first chemical conduit 46. At one end of each conduit, are connector means 52, 53 and 54 which are utilized to attach the connector assembly to the respective lines of 28, 29 and 30 of the five line assembly 11, as shown in FIG. 5. As is further shown in FIG. 4, the second chemical conduit 45 and the first conduit 46 have connector means 55 and 56 at its opposite ends for connecting the assembly 15 to the externally disposed input line connectors 42 and 43 of the packer device 12. However, as shown in FIG. 5, flexible interconnect hoses 57, 58, 59 and 60 are preferably utilized between the connector assembly 15 and the packer device 12, as well as between the input lines 26 and 27 of the five line assembly 11 and the packer device 12. The interconnect hoses 57, 58, 59 and 60 are, likewise equipped with connector means, so that the respective communicative connections between the packer 12, connector assembly 15 and five line assembly 11 can be easily made. These connecting means are generally of the threaded, mating type, however, they can be of any style such as the quick disconnect type, as can be appreciated, as long as the connection which results is tight and leak resistant.

The connector assembly 15 has a check valve 47 in test media conduit 44 which permits the flow of a test media fluid such as water or air via test media input 80 into the second chemical conduit 45 at a location beyond the actuatable valve 74.

Figure 6:
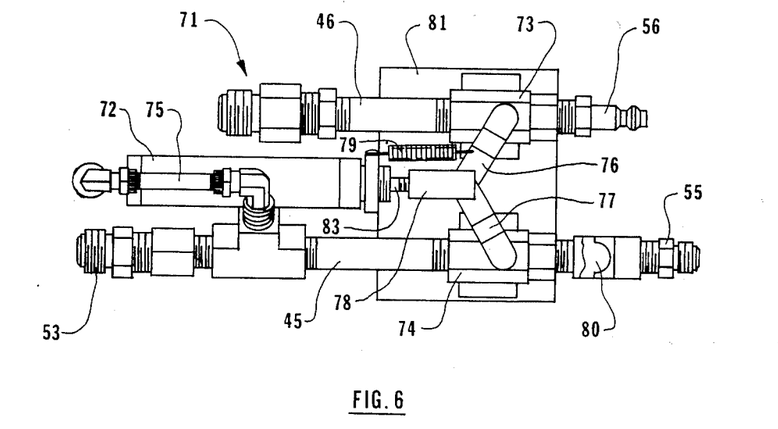
FIG. 6 is a schematic top view of a portion of the connector valve assembly showing the valve actuating means thereof.
Figure 7:
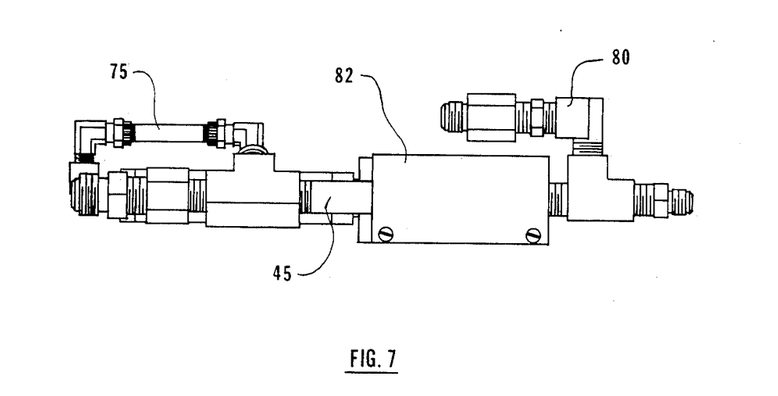
FIG. 7 is a schematic side view of the connector valve assembly shown in FIG. 6.

The portion encircled and marked 71 in FIG. 4 is more clearly shown in FIGS. 6 and 7. There, the actuatable valve means 73 and 74 as well as the valve actuating means are further illustrated.

The actuatable valves 73 and 74 are chemical ball valves that control the chemical fluid flow through the conduits 46 and 45. The valves 73 and 74 are actuated simultaneously by means of cylinder 72 (i.e., air cylinder) that has a piston 83 which is responsive to the pressure of the second chemical component through activator line 75. Levers 76 and 77 are mounted at one end for rotation (elongated end slots with a pin extending therethrough) with the movement of piston 83 and to the valves 73 and 74 for control on the opposite end. Thus, as the pressure in conduit 45 and actuator line 75 builds, the piston 83 moves clevis 78 outward to simultaneously open valves 73 and 74 via levers 76 and 77.

The fluid pressure in the first and second chemical conduits determine the mixing ratio of the two chemical components.

The valves 73 and 74 and other elements are fastened to a mounting plate 81 to make the connector assembly a unitary and rigid structure which can withstand use in sewer pipes. Importantly, a cover 82 is attached to the plate 81 to cover the moving portions of the actuating mechanism. And, importantly a return spring 79 is attached to lever 76 to return the levers 76 and 77 to close valves 73 and 74.

As shown in FIG. 6, the return spring 79 is connected between lever 76 and the body of cylinder 72 so that upon the release of fluid pressure in actuating line 75 the spring 79 forces the piston 83 to return to its original position to, thereby, simultaneously close valves 73 and 74. Alternatively, a biasing spring (compression spring) can be placed about the rear extension of a threaded piston portion and secured between an adjustment nut at the end thereof and the body of cylinder 72. Additionally, a rigid cover, i.e., metallic, is provided to protect the piston shaft extension and spring to protect the mechanism from sewege materials. This embodiment provides the adjustability of the return biasing spring means to close valves 73 and 74.

The utilization of an air cylinder 72 with modifications has been found suitable, although other means could be utilized, i.e., an electrically operated valve actuator. It is important, however, for cylinder 72 to have a sealed rigid body because of contact by the connector assembly with sewege, etc. while in use. For example, air cylinders are normally provided with an air pressure relief port which extends through its cylinder wall. This port hole is preferably closed or sealed to ensure that fluids and other waste materials do not enter the internal mechanism of the cylinder. The cover 82 mounted to plate 81 is further provided, as mentioned above, to keep the moving portions of the actuator mechanism free from contamination.

It is important to note that the chemical components preferably utilized in the sealing process of the packer device 12 is a urethane system comprised of a first, high viscosity component which is constantly under pressure in conduit 46, and a low viscosity activator component, or second chemical component in conduit 45. This urethane sealing system has been found highly preferable for use in the sealing of pipe line leaks. One such system is manufactured by Minnesota Mining and Manufacturing and is known as 3M Sealing Gel Compound CR-250.

With respect to the interconnection of the connector assembly 15 between the five line input assembly 11 and the inflatable packer device 12, as well as the operation of the packer device from the van 10, attention is directed to FIG. 5. As shown, the end element line 27, normally a $\frac{3}{8}$" hose, comes directly from the van 10 and is controlled by the control panel 61 for communication with the end elements 39 of the packer 12. As previously discussed, a generally a short, i.e., 24", flexible interconnect hose 58 is inserted betwen it and the packer. The latter being used primarily because the Penta hose assembly 11 quite stiff.

The outer sleeve line 26 is normally a $\frac{1}{4}$" hose, for example, and is controllable at the sealing control panel 61 for operating the external flexible sleeve 38 of the packer 12. As with the end element line 27, a short flexible interconnect hose 57, i.e., 24", and having connecting means disposed at each end, is inserted between the connecting means 31 of line 26 and the input line connector 40 of the packer 12 because of its Penta type hose construction. The $\frac{1}{4}$' diameter hose is preferable for this packer application because of its smaller air volume, which reduces the test time on the pipeline joint to be tested, while only slightly increasing the inflation time of the packer sleeve 38.

The test media line 28 is a $\frac{3}{8}$" hose which is connected to a water or air supply, depending upon the test media utilized. If air is the test media, the sealing control panel 61 supplies the air for testing, while the use of water has the sealing control panel connected to operate a water pump 64 which is in communication with water supply 63. Additionally, the changing of the test media from water to air, and visa versa, requires the activation of a switch at the control panel 61.

The catalyst or second chemical line 29 is generally a $\frac{3}{8}$" hose which extends from the catalyst pump 65 to the connector assembly 15. The catalyst line 29 is pressurized only in the sealing operation. In the testing or exhaust positions of the packer, the catalyst line 29 is at 0 psig.

The first chemical line 30 is generally a $\frac{1}{2}$" hose which connects the chemical pump 68 to the connector device 15. This line is pressurized to 450 psig (utilizing the urethane system described above), at all times because of its viscosity.

In operation, during the testing function, the water or air pressure media from line 28 opens the check valve 47 in the test media conduit 44, and enters the catalyst or first chemical conduit 45 for subsequent exit through the dispensing valve 37 of the packer 12. The test media is prevented from backing into the catalyst conduit 45 by valve 74.

During the sealing function, the catalyst pump 65 is activated as the solenoid valve 66 is closed. The pressure in conduit 45 increases to 50 psig within a few seconds, which activates cylinder 72 through actuator line 75. The forward movement of the piston 83 causes the valves 73 and 74 to open simultaneously. At the conclusion of the sealing function, the sealing control panel stops the catalyst pump 65. At that point, the solenoid valve 66 opens to relieve the catalyst pressure to the holding tank 70. And, the chemical valves 73 and 74 are closed by biasing spring 79 which has a force of less than 50 psig.

Thus, the testing and fluid transfer line system of the invention provides an operator with an additional test media line effective for use at the packer device, without requiring any internal line changes in the packer itself. The benefits of this added test media line are that a chemical component is no longer required for use, that added chemical agents, such as root inhibitors can be added to the test media, and that the two component mixing at the dispensing valves of the packer is more closely controllable and more directly effectuated.

It is clear that the test and fluid line system of this invention can be utilized in conjunction with any number of lines or hoses required at a packer, for example. The only requirement being that the grouting chemical composition be at least a two part system, so that the test media fluid can be ejected through one of the packer dispensing valves normally utilized.

As many changes are possible to the embodiments of this invention, utilizing the teachings thereof, the description above, and the accompanying drawings, should be interpreted in the illustrative, and not in the limited sense.

That which is claimed is:

1. A connector valve assembly for use with the first and second chemical line inlet connectors of an inflatable packer device having an externally disposed chemical dispensing assembly to test and seal a pipeline for leaks, said connector valve assembly being insertable between the packer device and a fluid inlet line assembly having a first chemical line, a second chemical line and a test media line, said assembly comprising:
 (a) a first chemical conduit having an actuable valve means and connector means at opposite ends for the controlled flow of a first chemical component,
 (b) a second chemical conduit having an actuatable valve means and connector means at opposite ends for the controlled flow of a second chemical component,
 (c) valve actuating means to simultaneously actuate the valve means in said first and second chemical conduits, and
 (d) a test media conduit having a check valve therein and a connector means at one end for the transfer of a testing fluid, said test media conduit being in communication at its opposite end to said second chemical conduit at a location after its actuatable valve, whereby,
with said connector valve assembly inserted between the fluid inlet line assembly and the inflatable packer device, the connector assembly enables the packer device to test a pipeline for leaks through its chemical dispensing assembly by the activation of the test media fluid which opens said check valve and permits its flow through said second chemical conduit, and to enable the packer device to seal a leak in the pipeline by simultaneously dispensing predetermined flow rates of two chemical components wherein at least one of said chemical component rates actuates said valve actuating means of said valve means of said first and second chemical conduits to permit said chemical component flow rates to flow through said chemical conduits and to the packer device.

2. The connector valve assembly of claim 1, wherein said valve actuating means is in communication with said second chemical conduit at a location before its actuatable valve, said valve actuating means being operable by the fluid pressure in said second chemical conduit.

3. The connector valve assembly of claim 2, wherein said valve actuating means is comprised of a sealed air cylinder, a clevis member and two levers in communication with said valve means of said first and second chemical conduits.

4. The connector valve assembly of claim 3, wherein said sealed air cylinder of said valve actuating means is adjustable to activate said valve means at a predetermined fluid pressure and wherein said assembly additionally has mechanical spring biasing means in communication with said cylinder to close said valve means.

5. The connector valve assembly of claim 4, wherein said sealed air cylinder is activated at approximately 50 psig.

6. The connector valve assembly of claim 3, wherein said test media line is additionally for transferring a root growing inhibitor component, wherein said test media line and said first chemical line are activatable at a control panel at a remote location, and wherein said second chemical fluid line additionally has pump means and is in communication with a fluid storage tank which is activatable by a solenoid valve from the control panel.

7. The connector valve assembly of claim 3, wherein said valve actuating means components are fastened to a mounting plate having a cover member to protect the components from sewege materials during use.

8. The connector valve assembly of claim 1, wherein said connector means of said first and second conduits leading to the packer device additionally has flexible tubing extensions with connectors attached thereto.

9. The connector valve assembly of claim 1, wherein said actuatable valves in said first and second conduits are comprised of chemical ball valves.

10. The connector valve assembly of claim 1, wherein said first chemical fluid line is to transfer fluids under a higher pressure than the fluid to be transferred in said second fluid line.

11. A connector valve assembly for use with a five fluid inlet line assembly to an inflatable packer device having an externally disposed chemical dispensing assembly to test and seal a pipeline for leaks, said connector valve assembly being insertable between the fluid inlet lines, having a first chemical line, a second chemical line, a test media line, an end element line and a sleeve element line, and the inflatable packer, additionally having input connectors for the first and second chemical lines, said connector valve assembly comprising:
 (a) a first chemical conduit having connector means at each end for transferring a first chemical component, and having actuatable valve means in communication therewith, said first chemical line conduit being under a constant pressure,
 (b) a second chemical conduit having connector means at each end for transferring a second chemical component, and having and actuatable valve means in communication therewith,
 (c) valve actuating means to simultaneously actuate the valve means of said first and second chemical conduits, said actuating means being activatable by the fluid pressure of one of said chemical components and being in communication with said second conduit at a location before its actuatable valve means, and
 (d) a test media conduit having connector means at one end for transferring a testing fluid therethrough, said test conduit having a check valve in communication therewith and being in communication with said second chemical conduit at a location beyond said actuatable valve means, whereby,
with said connector valve assembly inserted between the fluid inlet lines and the packer device, the packer device is able to test a pipeline for leaks through its dispensing valve assembly by the activation of the test media fluid which opens said check valve and permits its flow through said second chemical conduit, and whereby, the packer device is able to seal a leak in the pipeline by simultaneously dispensing predetermined rates of chemical components through the actuatable valve means and to the packer device, wherein said valve actuating means being in communication with the chemical component through one of said chemical conduits to actuate the actuatable value means in the first and second chemical conduits.

12. The connector valve assembly of claim 11, wherein said valve actuating means is comprised of a sealed air cylinder, a return spring means, a clevis member and two levers in communication with said actuatable valve means of said first and second chemical conduits.

13. The connector valve assembly of claim 11, wherein said sealed air cylinder of said valve actuating means is adjustable to activate said valve means at a predetermined fluid pressure.

14. The connector valve assembly of claim 13, wherein said sealed air cylinder is activated at approximately 50 psig.

15. The connector valve assembly of claim 11, wherein said valve assembly is of a rigid construction and wherein said valve actuating means components are fastened to a mounting plate having a cover member to protect the components from sewege materials during use.

16. The connector valve assembly of claim 11, wherein said connector means of said first and second conduits leading to the packer device additionally has flexible tubing extensions with connectors attached thereto.

17. The connector valve assembly of claim 11, wherein said actuatable valves in said first and second conduits are comprised of chemical ball valves.

18. A method for interiorly testing the walls of a pipe with an inflatable packer device having a two component grouting system and a three hose input system for transferring the two grouting components and a test media fluid, said method comprising:
   (a) providing an inflatable packer device in a pipeline section to be tested, said packer device having two chemical component input lines and being communicatable to external feeding lines having a test media line and two chemical component input lines,
   (b) inserting a connector valve assembly between said inflatable packer device and said external input lines, said connector valve assembly comprising:
   (1) a first chemical conduit having an actuable valve means and connector means at opposite ends for the controlled flow of a first chemical component,
   (2) a second chemical conduit having actuatable valve means and connector means at opposite ends for the controlled flow of a second chemical component,
   (3) valve actuating means to simultaneously actuate the valve means in said first and second chemical conduits, said valve actuating means being actuated by the controlled flow communication within said second chemical conduit at a location before its actuatable valve, and
   (4) a test media conduit having a check valve therein and a connector means at one end for the transfer of a testing fluid, said test media conduit being in communication at its opposite end to said second chemical conduit at a location after its actuatable valve,
   (c) expanding said packer device within the pipeline portion to be tested,
   (d) activating said test media line through said second chemical component input line, and
   (e) measuring the back pressure exerted on said inflated packer to determine leakage in the pipeline portion.

19. The process of claim 18, wherein said test media line of said connector valve means additionally supplies a root growing inhibitor to alleviate a pipe leaking cause.

20. The process of claim 18, wherein additionally provided is a hose input system which is controllable from a remote location to initiate flow through its lines.

* * * * *